United States Patent [19]

Legille et al.

[11] Patent Number: 4,606,677
[45] Date of Patent: Aug. 19, 1986

[54] DEVICE FOR INTRODUCING DOSED QUANTITIES OF PULVERIZED SOLID MATERIALS INTO A CARRIER GAS STREAM

[75] Inventors: Edouard Legille, Luxembourg; Leon Ulveling; Pierre Mailliet, both of Howald, all of Luxembourg

[73] Assignee: Paul Wurth S.A., Luxembourg, Luxembourg

[21] Appl. No.: 550,565

[22] Filed: Nov. 10, 1983

[30] Foreign Application Priority Data

Nov. 10, 1982 [LU] Luxembourg ............... 84462
May 19, 1983 [LU] Luxembourg ............... 84812

[51] Int. Cl.$^4$ ............................................. B65G 53/46
[52] U.S. Cl. ............................................. 406/129
[58] Field of Search ................. 406/93, 129, 144; 222/504, 548, 555, 557, 560; 239/687, 670

[56] References Cited

U.S. PATENT DOCUMENTS

| 2,731,302 | 1/1956 | Upham | 406/129 |
| 3,006,512 | 10/1961 | Keathley | 222/504 |
| 3,527,503 | 9/1970 | Mundinger | 406/129 |
| 3,840,158 | 10/1974 | Baker | 222/504 |

FOREIGN PATENT DOCUMENTS 1493525 11/1977 United Kingdom .
371147 5/1973 U.S.S.R. ............... 406/129

Primary Examiner—Joseph F. Peters, Jr.
Assistant Examiner—Mary Beth O. Jones
Attorney, Agent, or Firm—Fishman & Dionne

[57] ABSTRACT

A device for introducing dosed quantities of pulverized solid materials into a carrier gas stream is presented. The device is particularly suitable for injecting solid fuels into a shaft furnace during metal refining. The device comprises a housing which defines a flow chamber in the axial direction for the flow of pressurized fluid or carrier gas. The housing also has a side aperture therethrough. The side aperture is connected to a container holding pulverized materials. Coaxial inner and outer sleeves, at least one of which is capable of rotation, are located within the housing. The outer sleeve communicates with the aperture while the inner sleeve has an axial bore which provides a passage for the carrier gas. Upon rotation of a sleeve, slots provided on each sleeve will align and overlap with each other and with the aperture to define a variable sized passage between the container and axial bore whereby the pulverized material is delivered therethrough to the carrier gas stream.

16 Claims, 20 Drawing Figures

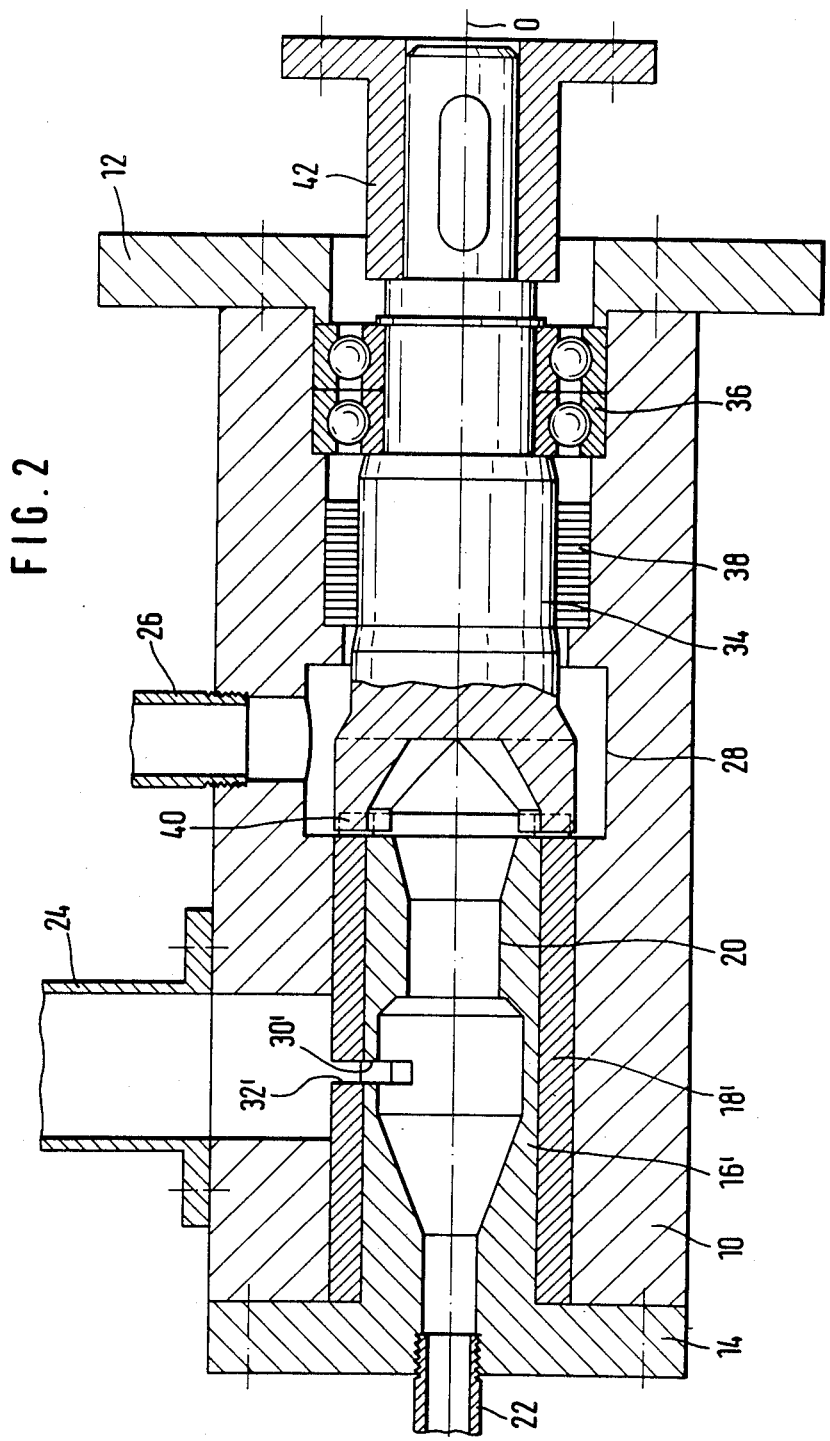

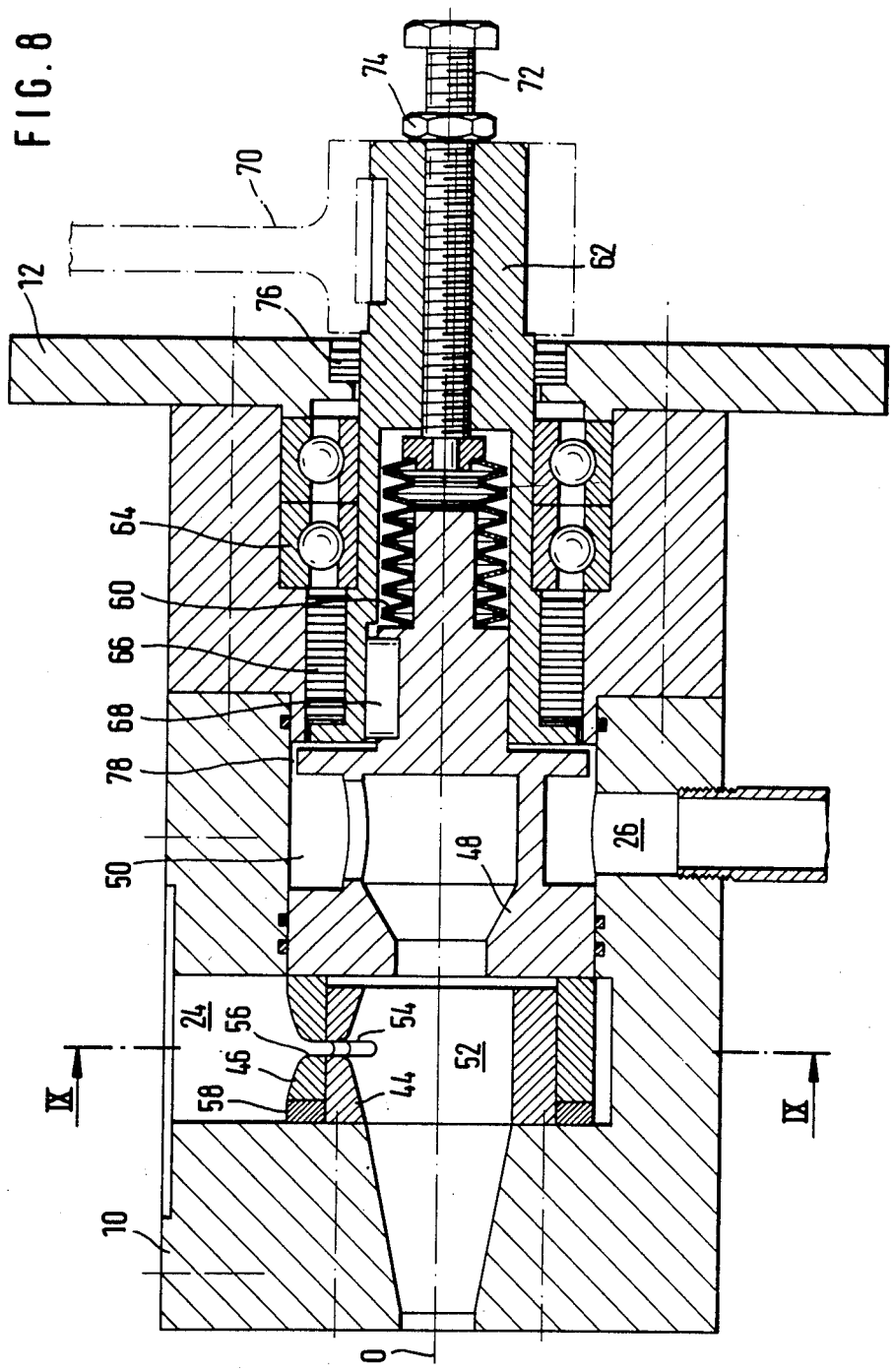

DEVICE FOR INTRODUCING DOSED QUANTITIES OF PULVERIZED SOLID MATERIALS INTO A CARRIER GAS STREAM

BACKGROUND OF THE INVENTION

The present invention relates to an apparatus for introducing measured or dosed quantities of pulverized or pulverulent materials into a carrier gas stream. This invention is particularly applicable to the operation of injecting solid fuels into a shaft furnace during a metal refining process.

European Patent Application No. 0043606 describes a pneumatic transport device for pulverulent materials, particularly coal and/or lignite dust. A pneumatic current or carrier gas stream is formed by the introduction or entrainment of pulverized particles (i.e., coal dust) into a current of pressurized air, whereby the finely dispersed particles are propelled therethrough. The well know prior art method for effecting this carrier gas stream involves a honeycomb-type rotor having plural chamber means. A typical prior art pneumatic transport device comprises, then, a cylindrical rotor peripherally provided with plural vanes which define individual and corresponding compartments or cells. This rotor will rotate within a housing about its longitudinal axis in a hermetic fashion, so that the pulverized material fed in from the top is conveyed downwardly via the compartments or cells into a current of compressed air, the compressed air serving as a propulsion fluid or carrier gas. This carrier gas thus carries or entrains the pulverized material subsequent to delivery by the compartment or cells.

This well known type of dosing apparatus has certain serious deficiencies and problems. One such problem involves the leakage of very fine particles of the pulverulent material from the cells or chambers into and along both the rotor shaft and rotor bearings. Unfortunately, these extremely fine particles easily migrate into virtually every area of the dosing mechanism including the small circular interstice located between the rotor shaft and the internal surface of the bearing. Although very small, this interstice is necessary in order to avoid undesirable friction.

The incidence of pulverized particle leakage is further aggravated by the difference between the pressure in some areas of the dosing device (atmospheric) and the high pressure of the carrier gas. This leakage presents many serious difficulties. For example, there is an increased risk of premature wear due to seizing caused by the pulverized material. The leakage will also create difficulties in accurately controlling dosage quantities.

SUMMARY OF THE INVENTION

The above discussed and other problems of the prior art are overcome or alleviated by the apparatus of the present invention. In accordance with the present invention, a novel device is provided for the introduction of measured or dosed quantities of pulverized solid materials into a pneumatic propulsion fluid or carrier gas which prevents the aforementioned undesirable leakage.

The present invention comprises a preferably cylindrical housing partially traversed in the axial direction by a pressurized fluid or carrier gas. The housing also has a side or radial aperture or opening which communicates with a tank containing pulverized solid material. The pressure in the tank should be above that of the carrier gas. The housing further contains two coaxial sleeves defined as an inner sleeve and an outer sleeve. The inner sleeve has an axial bore which provides passage therethrough to the carrier gas. At least one of the two sleeves is capable of rotating about its longitudinal axis and is connected for this purpose to a suitable device for imparting rotation. Each of the sleeves is further provided with a slot positioned so as to correspond with each other and with the side or radial aperture on the housing. Thus, the slots are permitted to meet and overlap each other as the rotatable sleeve rotates about its axis. Preferably, the slots in both sleeves are respectively identical in shape and thereby complimentary. The respective overlapping and identical slots on the inner and outer sleeves thus define a passage of varying size (depending on the position of the rotating sleeve). This passage allows pulverized material in the tank to pass through the carrier gas stream which flows through the inner sleeve.

In a first embodiment of the present invention, the inner sleeve is movable (rotatable) and the outer sleeve is integral or attached to the housing while in a second embodiment, the inner sleeve is fixed and the outer sleeve is movable. This second embodiment offers an advantage over the first embodiment by reducing the risk of forming a build-up or "bridge" as discussed and defined in more detail hereinafter.

In accordance with a third preferred embodiment, the length of the two sleeves are approximately equal to the diameter of the side aperture of the housing. An annular friction ring is provided between the housing and the annular front surface of the movable sleeve. The movable sleeve is subjected to axial force provided by a spring means which acts to keep the sleeve in contact with the ring. Preferably, the spring should be provided with adjustable tensioning means. Finally, the outer diameter of the outer sleeve is preferably less than the internal diameter of the cylindrical housing in order to define an annular space between the outer sleeve and the housing and to reduce the risk of seizing.

The above-discussed and other advantages of the present invention will be apparent to and understood by those skilled in the art from the following detailed description and drawings:

BRIEF DESCRIPTION OF THE DRAWINGS

Referring now to the drawings wherein like elements are numbered alike in the several FIGURES:

FIG. 1 is a cross sectional elevation view of a first embodiment of a dosing device in accordance with the present invention.

FIG. 2 is a cross sectional elevation view of a second embodiment of a dosing device in accordance with the present invention.

FIG. 3*a* is a cross sectional elevation view of the dosing device of FIGS. 1 and 2, showing two sleeves in an open position.

FIG. 3*b* is a cross sectional elevation view of the dosing device of FIG. 3*a* showing the two sleeves in a partially open position.

FIG. 3*c* is a cross sectional elevation view of the dosing device of FIG. 3*a* showing the two sleeves in a partially closed position.

FIG. 3*d* is a cross sectional elevation view of the dosing device of FIG. 3*a* showing the two sleeves in a closed position.

FIGS. 4a, 4b and 4c are schematic views of cooperating slots in different positions having a first configuration.

FIG. 8 is a cross sectional elevation view of a third embodiment of a dosing device in accordance with the present invention.

DESCRIPTION OF THE PREFERRED EMBODIMENT

Figure 1:
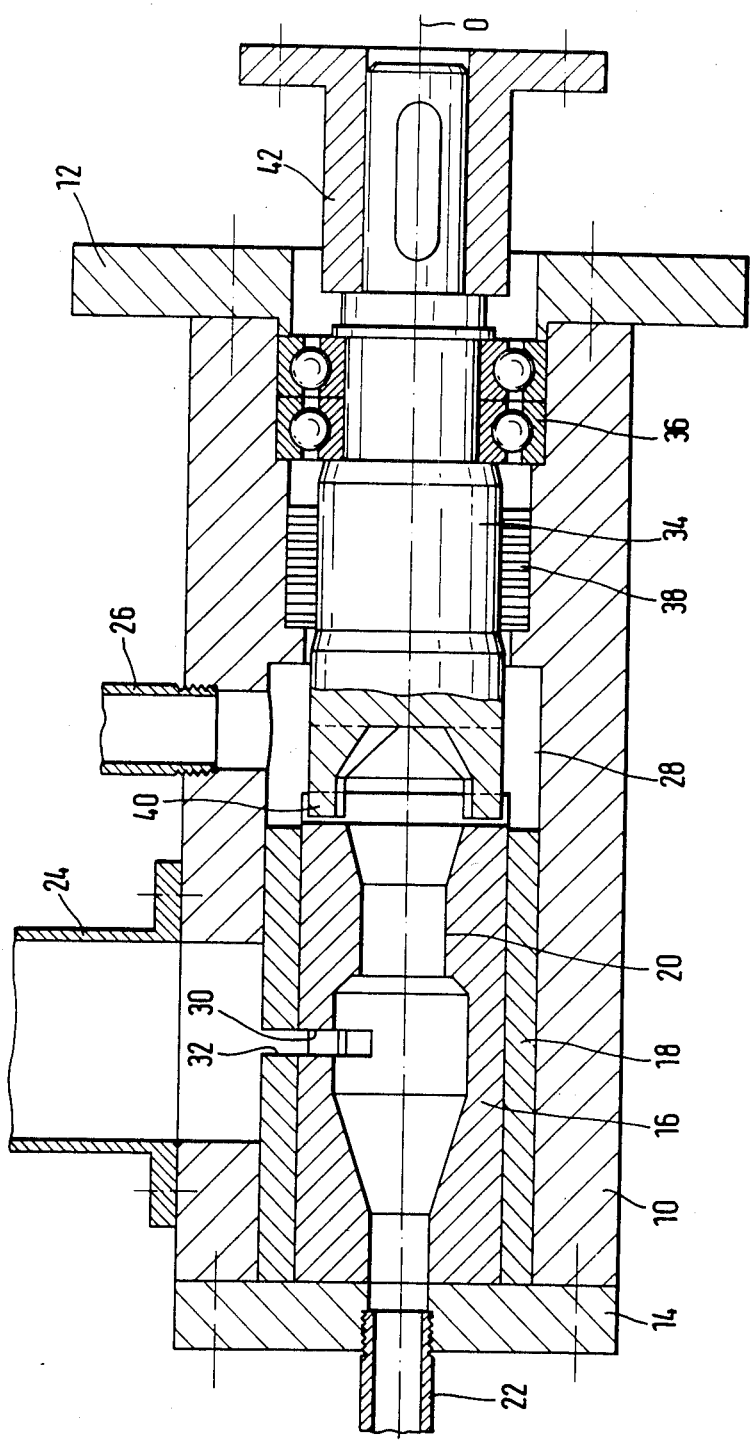

Referring first to FIG. 1, a novel dosing device in accordance with the present invention is shown. The dosing device consists of a cylindrical housing 10 which is enclosed at either end via securing flange 12 and a front plate 14. The housing 10 contains therein, two coaxial cylindrical sleeves 16 and 18 defined as an inner sleeve 16 and an outer sleeve 18. In the illustrated embodiment, the outer sleeve 18 is fixed in position and integral with the front plate 14 while the inner sleeve 16 can freely rotate about the longtitudinal axis O. Running longitudinally along the inside center of inner sleeve 16 is axial bore 20 which communicates with a pneumatic transport pipe or carrier gas pipe 22. The housing 10 also has two lateral pipes 24 and 26, the pipe 24 communicating with a tank containing pulverized solid materials and the pipe 26 being connected to a source of compressed air which acts to convey the pulverized materials through the pipe 22. The pipe 26 is in direct communication via annular chamber 28 with the axial bore 20 of the inner sleeve 16. The two sleeves 16 and 18 are each provided with lateral or radial slots 30 and 32 respectively. These slots are positioned at a place corresponding to the point where the pulverized material exits from pipe 24. Thus, these slots define a passage between the pipe 24 and the axial bore 20 having a size which will be variable according to the angular position occupied by the movable or rotatable sleeve 16.

Figure 3A:
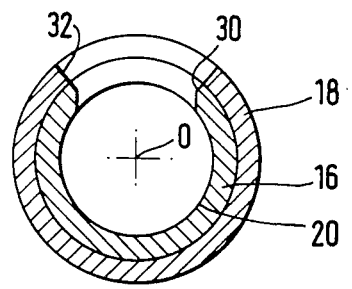
Figure 3B:
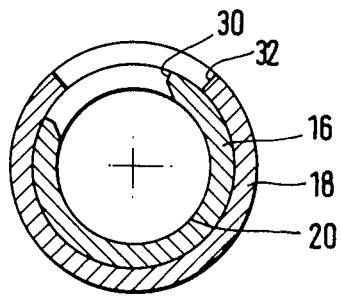
Figure 3C:
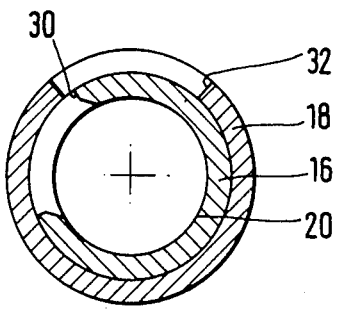
Figure 3D:
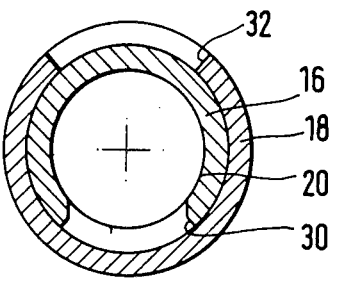

FIGS. 3a through 3d are cross sections through the slots 30 and 32 which show different angular positions for the inner movable sleeve 16. In the position shown in FIG. 3a, the sleeve 16 has been positioned such that the slots 30 and 32 are in full alignment thereby defining a passage between the pipe 24 and bore 20 of maximum obtainable width. Starting from the position shown in FIG. 3a, a rotation of the sleeve 16 will gradually reduce the cross section of the opening or passage between the pipe 24 and the axial bore 20. In FIGS. 3b and 3c, this passage narrows to a minimum width. Finally in FIG. 3d, the device completely closes.

To enable the movable sleeve 16 to be rotated as required, a drive shaft 34 is provided at the end opposite the discharge pipe 22. The shaft 34 is mounted in the housing 10 with the aid of a sealing ring 38, leakage of compressed air thus being prevented therefrom. This drive shaft 34 is made connected for rotation with the movable sleeve 16 by means, for example, of two diametrically opposed grips 40 which engage corresponding grooves in the front of the sleeve 16. The drive shaft 34 is connected by a sleeve member 42 to a stepping motor (not shown). One prototype of the present invention has utilized a motor which applied an electrical impulse to produce a rotation of 0.36° at a speed of 1–2 rpm.

An understanding of the operation of the present invention clearly emerges from the following description thereof: The compressed air or carrier gas coming from the pipe 26 passes through the annular chamber 28, and into and through the internal axial bore 20 towards the pneumatic pipe 22. The compressed gas carries along with it the pulverized material (i.e., coal dust) introduced via the calibrated aperture defined by the interaction of the slots 30 and 32. The material is delivered through the slots, in part, because of a difference between the higher pressure in the tank containing the pulverized solids (not shown in the drawing) and the lower pressure of the air in the bore 20.

By comparison with the honeycombed rotor of the prior art, the major novel improvement achieved by the dosing device of the present invention essentially consists of the limited number of moving parts. In the prior art rotors having a honeycomb-type chamber, the change in the rate of delivery of pulverized material was brought about by altering the rotation speed of the chamber. Conversely, the output of pulverized material of the present invention in the device can be adjusted simply by modifying the angular position occupied by the movable sleeve. It should be noted in fact, that as long as the rate of delivery is constant there is no component in motion at all; since the movable sleeve remains stationary, whereas the prior art device required constant rotation of the honeycomb-type chamber.

The fact that in the present invention there are normally no moving mechanical parts (movement occuring only when a change in flow rate is effected) reduces the risk of pulverized particles leaking and also the chance of seizing in these parts. Nevertheless, if any particles do escape between the two sleeves 16 and 18 in the direction of the annular chamber 28, they would be taken up by the current of compressed air (carrier gas) coming from the pipe 26 and be once again carried towards the pneumatic evacuation pipe 22.

In the embodiment shown in FIG. 2, the reference numerals used in FIG. 1 have been retained, but with the addition of a prime, where the same elements recur and perform similar functions.

The essential difference between the two embodiments resides in the fact that in the device shown in FIG. 2, the inner sleeve 16' is fixed in position and integral with the front plate 14, while the inner socket 18' is movable and connected for this purpose to the driving shaft 34 in the same manner as in the embodiment shown in FIG. 1. The two slots 30' and 32' provided in the sockets 16' and 18' again define the cross section of the passage through which the pulverized material may flow.

Despite the seemingly identical operation of the first and second embodiments, the device as shown in FIG. 2 does in fact offer a certain advantage over the structure of the first embodiment owing to the fact tht outer sleeve 18' is movable as opposed to the inner sleeve 16. It appears that the pulverized material which is supplied under pressure through pipe 24 tends to form a build-up or "bridge" around the slot 32 or 32' of the sleeve 18 or 18'. This "bridge" will obviously decrease the amount of material passing down through to the carrier gas. In the second embodiment where the sleeve 18' is the movable element, there is a far lesser risk of creating such an undesirable "bridge".

Referring now to FIGS. 4, 5, 6 and 7, slots of different shapes and in various positions are shown in plan view as seen looking down through the aperture 24. In the case of FIGS. 4a to 4c, the slots are shaped as elongated ovals 30 and 32 which, in the position illustrated in FIG. 4a, only overlap to a very small extent, thus defining a flow passage of circular cross section, the width of the passage for the material thus being at its minimum. A rotation of the movable socket 30 or 32 will increase the cross section of the aperture, as shown in FIG. 4b, with the cross section of the flow passage reaching its maximum size in the position shown in FIG. 4c wherein the two slots 30 and 32 are in full alignment.

Figure 4A:
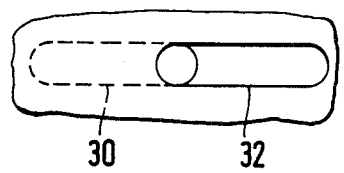
Figure 4B:
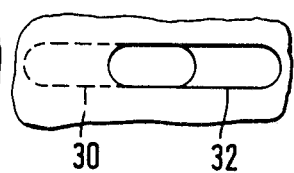
Figure 4C:
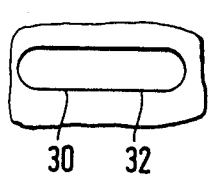
Figure 5A:
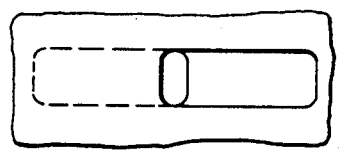
FIGS. 5a, 5b and 5c are schematic views of cooperating slots in different positions having a second configuration.
Figure 5B:
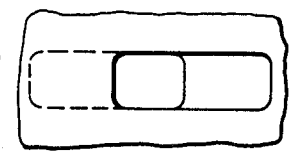
Figure 5C:
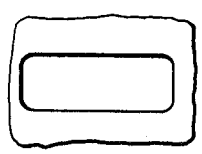

Similarly, in FIGS. 5, 6 and 7 the positions shown in FIGS. 4a, 4b and 4c respectively are retained, but now the slots have alternative shapes. The set of slots in FIGS. 5a to 5c are wider (more rectangular) than the set of slots in FIGS. 4a to 4c and allow a greater delivery rate of pulverized material.

Figure 6A:
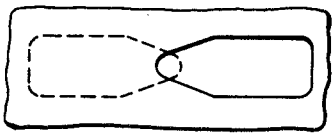
FIGS. 6a, 6b and 6c are schematic views of cooperating slots in different positions having a third configuration.
Figure 6B:
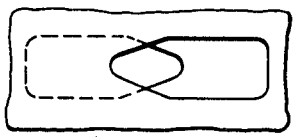
Figure 6C:
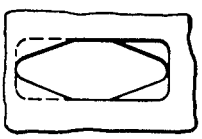
Figure 7A:
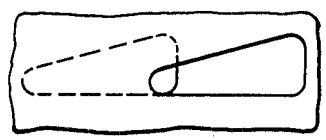
FIGS. 7a, 7b and 7c are schematic views of cooperating slots in different postions having a fourth configuration.
Figure 7B:
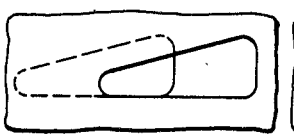
Figure 7C:
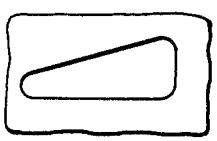

The particular shape in the series of slots shown in FIGS. 6 and 7 are specially characterized by the fact that the adjustment of the cross section of the aperture is effected both in the direction of its length and in the direction of its width. This offers the advantage that the cross section is more quickly modified. Also, another advantage is that the movable socket need not perform as great a rotation for a given modification. The modification in the width of the cross section may also help to reduce the risk of the formation of a "bridge" as described earlier. As shown in FIGS. 6a–6c, the slots have an arrow shape while FIGS. 7a–7c disclose slots having a triangular shape.

Figure 9:
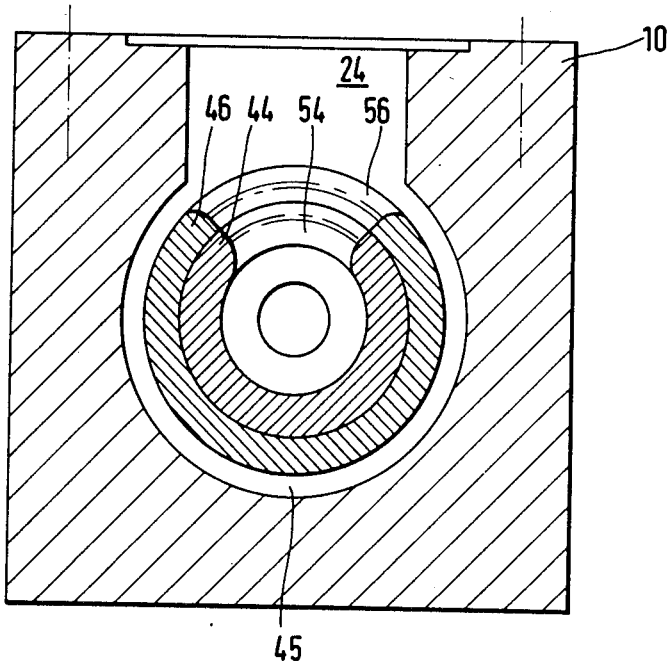
FIG. 9 is a cross sectional view along the line 9—9 in FIG. 8 and in accordance with the present invention.

In the preferred embodiment of the present invention shown in FIGS. 8 and 9, the interior of the housing 10 contains two dosing sleeves 44 and 46 having a similar structure to the dosing sleeves described earlier. In the embodiment of FIGS. 8 and 9, the sleeve 44 is fixed in position and integral with the housing 10, while the sleeve 46 is movable or rotatable about the longitudinal axis O. Sleeve 46 is fixed to and forms the front portion of a rotatable cylindrical body 48 capable of sliding longitudinally in a longitudinal bore provided in the housing 10. The compressed air is supplied from conduit 26 and via both an annular chamber 50 located in the body 48 and the hollow central part of the chamber, to a mixing chamber 52 inside the inner sleeve 44. The mixing chamber 52 extends along the longitudinal axis of the housing 10 towards a pneumatic transport pipe (not shown). It should be understood that alternatively, the sleeve 44 may be movable while the sleeve 46 is fixed, as in the embodiment of FIG. 2.

The two sleeves 44 and 46 are provided with dosing slots 54, 56 (see also FIG. 9) respectively. The dosing slots 54, 56 are actuated (i.e., relatively adjusted to form passages of varying size) by the rotation of the movable sleeve about the axis O as already described in detail with reference to the preceding figures.

The main difference between the embodiment shown in FIGS. 8 and 9 and that of the preceeding FIGURES resides in the axial length of the dosing sleeves. Thus, in the embodiments of FIGS. 1 and 2, these sleeves are comparatively longer in order to isolate the interior of the dosing device from the tank of pulverized solid material while the length of the sleeves 44 and 46 of FIG. 8 is reduced to a minimum. In the dosing devices described in the earlier FIGURES, particularly in the embodiment shown in FIG. 2, the pulverized material, as shown in the left-hand portion of the diagrams, might find its way in between the movable sleeve and the inner surface of the housing and between the inner surface of the movable sleeve and the outer surface of the fixed sleeve. If the powdered material was allowed in those areas, the risk of seizing would increase.

Conversely, in the embodiment shown in FIG. 8, the pulverized material can only penetrate, at the most, the surface area between the two sleeves. Because that surface area is very limited in size and despite the presence of a small gap or clearance therebetween, the risk of seizing is greatly reduced. Note that the gap or clearance between the two sleeves presents no problem (i.e., hermeticity is ensured) due to a friction ring 58, which may be made, for example, of an alloy of teflon and bronze, and which in the FIG. 8 embodiment is positioned around the fixed sleeve 44 between the housing 10 and the end of the movable sleeve 46. This movable sleeve 46 is held against the ring 58 by the action of a spring 60.

As shown in FIG. 9, the outer diameter of the outer sleeve 46 is less than the internal diameter of a part of the housing 10. Thus, an annular chamber 45 is defined between the outer sleeve and the housing which further reduces the risk of seizing by allowing the pulverized material a circulating path.

The function of elastically holding the sleeve 46 against the ring 58 is performed by a spring 60, e.g., of the Belleville type, gripped between the body 48 and a jacket 62. This jacket 62 is fixed in the axial direction but is nonetheless able to rotate about the axis O. This rotation is provided by mounting the jacket 62 in ball bearings 64 and sealing rings 66, 76. The action of the spring 60 is therefore exerted on the body 48 and the sleeve 46, in the direction of the friction ring 58. The longitudinal movement of the body 48 is rendered independent of the jacket 62 and the angular movements between these components are rendered dependent by any known means, e.g., a pin 68 such as shown in the diagram. The rotation of the jacket 62 may be effected by means of a handle 70, whereby the rotation of the movable sleeve 46 and the masking of the slots 54 and 56 will vary by a greater or smaller extent, as explained with reference to the preceeding FIGURES. In a preferred embodiment, the pressure of the spring 60 is adjustable, e.g., by means of a regulating rod 72 and a securing nut 74.

To enable the sleeves to be made still shorter and the risk of seizing to be at the same time reduced, the aperture 24 may have an oval shape instead of a circular shape.

Finally, in order to increase the mechanical strength of the two sleeves, they should preferably be made from fritted tungsten, which renders them extremely hard. This tungsten material will necessitate the use of diamond wheels during machining processes.

It should also be noted that in order to ensure that the action of the spring 60 will not be counteracted or nullified by the pressure of the air admitted to the chamber 52, the compressed air should preferably be admitted via channels or interstices 78 in the chamber containing the spring 60.

All of the embodiments of the present invention shown in the figures are aptly suited for use in the refining of metals. In particular, the present invention provides an improved and novel device for injecting solid fuels (i.e., carbonaceous materials) into a shaft furnace.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for introducing pulverized materials in a carrier gas stream comprising:
   housing means, said housing means having an axial flow passage for a pressurized carrier gas stream;
   aperture means in said housing for delivery of pulverized material;
   inner sleeve means in said housing means and extending across said aperture means, said inner sleeve means having an axial bore, said bore providing a passage for the carrier gas stream;
   outer sleeve means, said outer sleeve means being coaxial with said inner sleeve means and extending across said aperture means, at least one of said outer and inner sleeve means being rotatable about its longitudinal axis;
   means for rotating at least one of said outer and inner sleeve means wherein at least one of said sleeve means defines a rotatable sleeve means;
   at least a first slot on said inner sleeve means and at least a second slot on said outer sleeve means, said first and aecond slots being capable of mutual overlapping alignment with each other and with said aperture means to define a variable sized passage whereby pulverized material is delivered therethrough to said carrier gas stream;
   an annular friction ring, said friction ring being located between said housing means and said rotatable sleeve means; and
   spring means, said spring means being normally in contact with and acting on said rotatable sleeve means to urge said sleeve means against said friction ring.

2. The dosing device of claim 1 wherein:
   said inner sleeve means is rotatable about its longitudinal axis; and
   said outer sleeve means is fixedly engaged within said housing.

3. The dosing device of claim 1 wherein:
   said outer sleeve means is rotatable about its longitudinal axis; and
   said inner sleeve means is fixedly engaged within said housing.

4. The dosing device of claim 1 wherein said rotating means includes:
   a drive shaft means; and
   means for connecting said drive shaft means to at least one of said rotatable means.

5. The dosing device of claim 4 wherein said connecting means includes:
   grip means located on said drive shaft;
   groove means located on said rotatable sleeve means, said grip means engaging said groove means.

6. The dosing device of claim 4 including sealing means surrounding said drive shaft means thereby preventing pressurized fluid leakage.

7. The dosing device of claim 1 wherein said first and second slots have an elongated oval shape.

8. The dosing device of claim 1 wherein said first and outer slots have a rectangular shape.

9. The dosing device of claim 1 wherein said first and second slots have an arrow shape.

10. The dosing device of claim 1 wherein said first and second slots have triangular shape.

11. The dosing device of claim 1 wherein said inner sleeve means and said outer sleeve means have a length approximately equal to the diameter of said aperture means.

12. The dosing device of claim 1 including:
    means to adjust the tension of said spring means on said rotatable sleeve means.

13. The dosing device of claim 1 wherein:
    the outer diameter of said outer sleeve means is less than the inner diameter of said housing means defining an annular chamber between said outer sleeve means and said housing means.

14. The dosing device of claim 1 wherein:
    said inner and outer sleeve means are made from tungsten.

15. The dosing device of claim 1 wherein:
    said aperture means has a circular shape.

16. The dosing device of claim 1 wherein:
    said aperture means has an oval shape.

* * * * *